(12) United States Patent
Mermoud et al.

(10) Patent No.: US 9,722,905 B2
(45) Date of Patent: Aug. 1, 2017

(54) PROBING TECHNIQUE FOR PREDICTIVE ROUTING IN COMPUTER NETWORKS

(71) Applicant: Cisco Technology, Inc., San Jose, CA (US)

(72) Inventors: Grégory Mermoud, Veyras (CH); Jean-Philippe Vasseur, Saint Martin d'Uriage (FR); Diane Bouchacourt, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 487 days.

(21) Appl. No.: 14/277,411

(22) Filed: May 14, 2014

(65) Prior Publication Data

US 2015/0333997 A1 Nov. 19, 2015

(51) Int. Cl.
*H04L 12/26* (2006.01)
*G06F 13/00* (2006.01)
*H04L 12/701* (2013.01)
*H04L 12/24* (2006.01)
*H04L 12/753* (2013.01)

(52) U.S. Cl.
CPC ............ *H04L 43/12* (2013.01); *G06F 13/00* (2013.01); *H04L 41/142* (2013.01); *H04L 41/147* (2013.01); *H04L 43/04* (2013.01); *H04L 45/00* (2013.01); *H04L 43/067* (2013.01); *H04L 43/0876* (2013.01); *H04L 45/48* (2013.01)

(58) Field of Classification Search
None
See application file for complete search history.

(56) References Cited

U.S. PATENT DOCUMENTS

2011/0075578 A1 3/2011 Kim et al.

FOREIGN PATENT DOCUMENTS

CN 101296180 A 10/2008
EP 1505518 A1 2/2005

OTHER PUBLICATIONS

'6180B, "Wireless Mesh Network self-adapting routing method based on throughput performance," Nov. 10, 2010, Chinese Patent No. CN 101296180B Machine Google Translation, all pages.*
International Search Report and Written Opinion dated Jul. 13, 2015 in connection with PCT/US2015/029685.
Gnawali, et al., "The Minimum Rank with Hysteresis Objective Function", Request for Comments 6719, Sep. 2012, 13 pages, Internet Engineering Task Force Trust.
Thubert, P., "Objective Function Zero for the Routing Protocol for Low-Power and Lossy Networks (RPL)", Request for Comments 6552, Mar. 2012, 14 pages, Internet Engineering Task Force Trust.

(Continued)

*Primary Examiner* — Kwang B Yao
*Assistant Examiner* — Adam Duda
(74) *Attorney, Agent, or Firm* — Parker Ibrahim & Berg LLC; James M. Behmke; Stephen D. LeBarron

(57) ABSTRACT

In one embodiment, network information associated with a plurality of nodes in a network is received at a device in a network. From the plurality of nodes, a node is selected based on a determination that the selected node is an outlier among the plurality of nodes according to the received network information. Then, a probe is sent to the selected node, and in response to the probe, a performance metric is received from the selected node at the device.

21 Claims, 15 Drawing Sheets

(56) References Cited

OTHER PUBLICATIONS

Tong, et al., "Active Learning for Parameter Estimation in Bayesian Networks", Advances in Neural Information Processing Systems 13, NIPS 2000, pp. 647-653.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Internet Engineering Task Force, Request for Comments 6550, Mar. 2012, 157 pages, Internet Engineering Task Force Trust.

\* cited by examiner

PROBING TECHNIQUE FOR PREDICTIVE ROUTING IN COMPUTER NETWORKS

TECHNICAL FIELD

The present disclosure relates generally to computer networks, and, more particularly, to probing techniques in computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

During network operation, probing is often utilized for collecting information that is essential for maintaining and optimizing performance of the network. However, in most computer networks, and particularly in bandwidth-constrained LLNs, the cost of probing is extremely high. Indeed, mesh networks have such limited bandwidth that even small Internet Control Message Protocol (ICMP) probes can affect the performance of the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

OVERVIEW

According to one or more embodiments of the disclosure, network information associated with a plurality of nodes in a network is received at a device in a network. From the plurality of nodes, a node is selected based on a determination that the selected node is an outlier among the plurality of nodes according to the received network information. Then, a probe is sent to the selected node, and in response to the probe, a performance metric is received from the selected node at the device.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
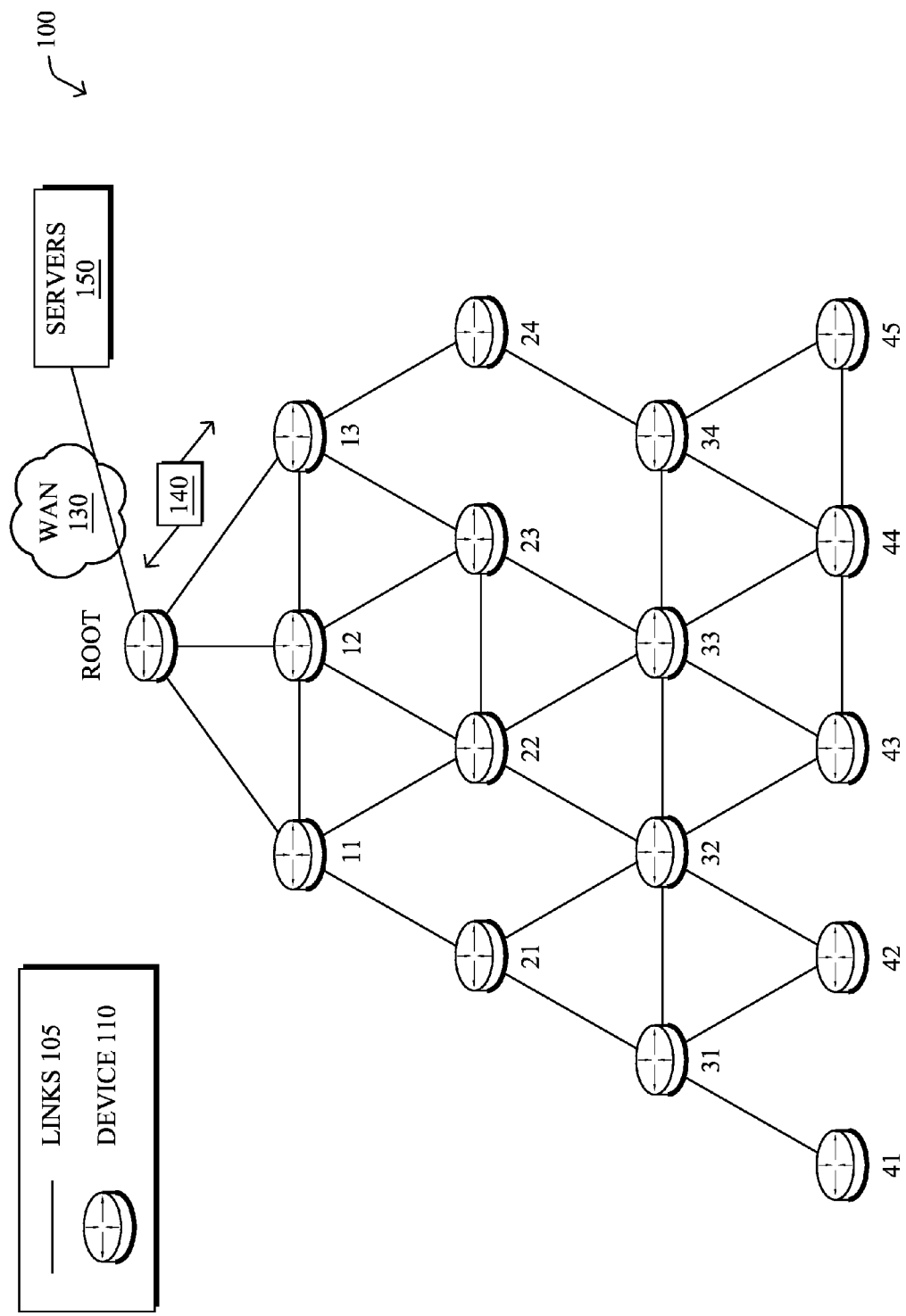
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
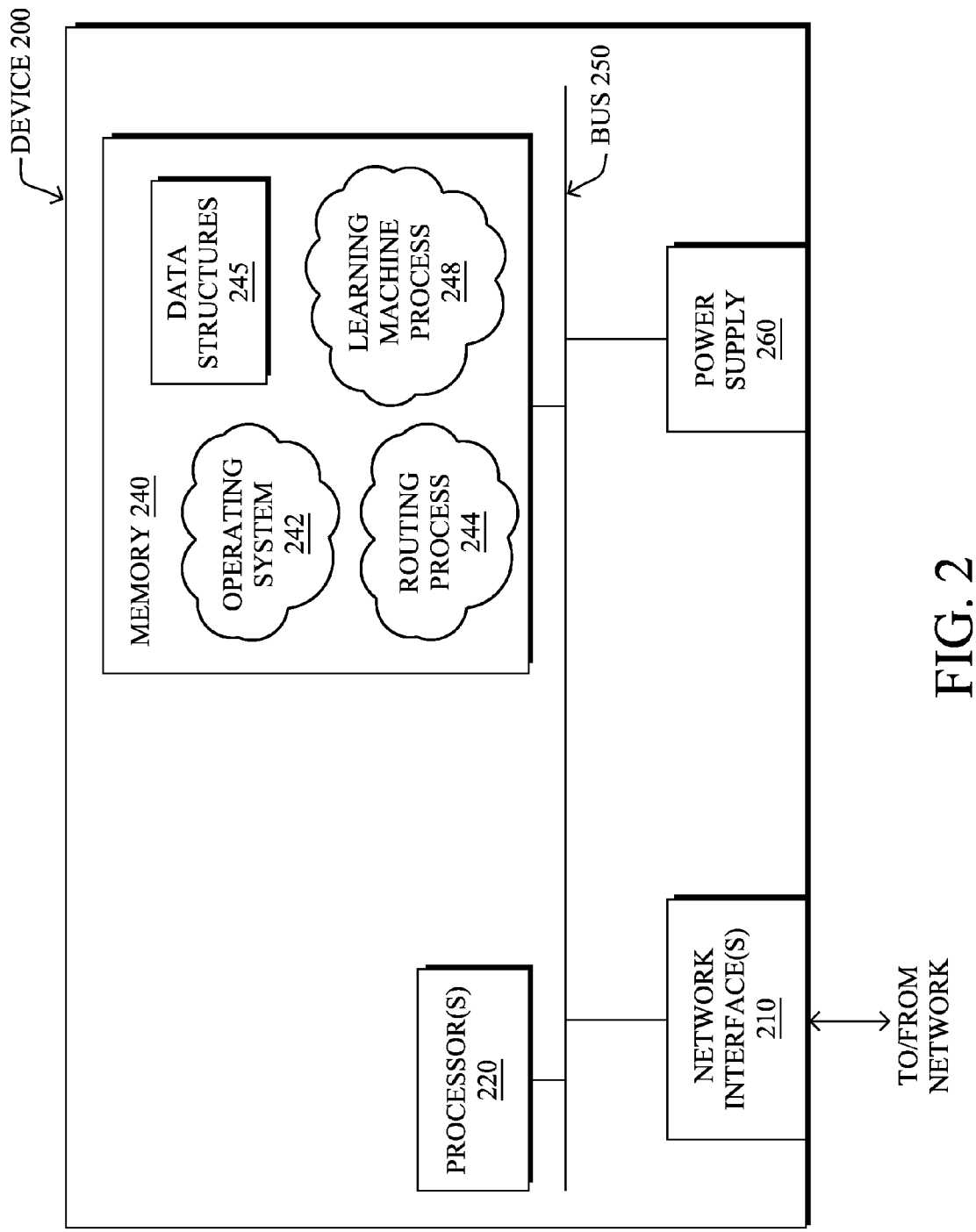
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine processes to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Learning machine process 248 includes computer executable instructions executed by the processor 220 to perform various functions, such as smart probing techniques. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The learning process then operates by adjusting the parameters (a, b, c) such that the number of misclassified points is minimal. After this optimization phase (or learning phase), the model M can be used very easily to classify new data points. Often, M is a statistical model, and the cost function is inversely proportional to the likelihood of M, given the input data.

Learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

As noted above, low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example performance metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis"<RFC 6719> by O. Gnawali et al. (September 2012 version).

Building a DAG may utilize a discovery mechanism to build a logical representation of the network, and route dissemination to establish state within the network so that routers know how to forward packets toward their ultimate destination.

Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
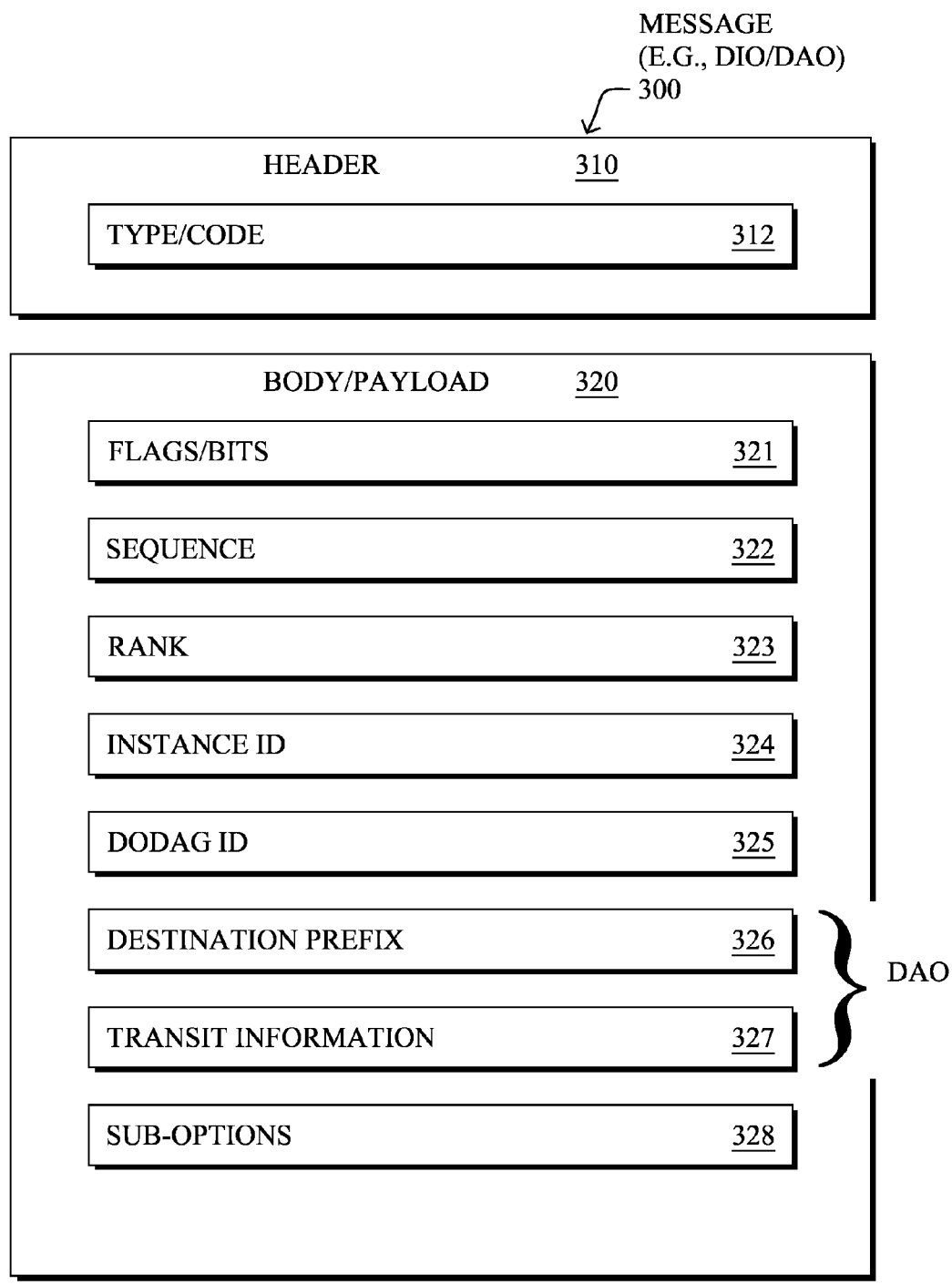
FIG. 3 illustrates an example control message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
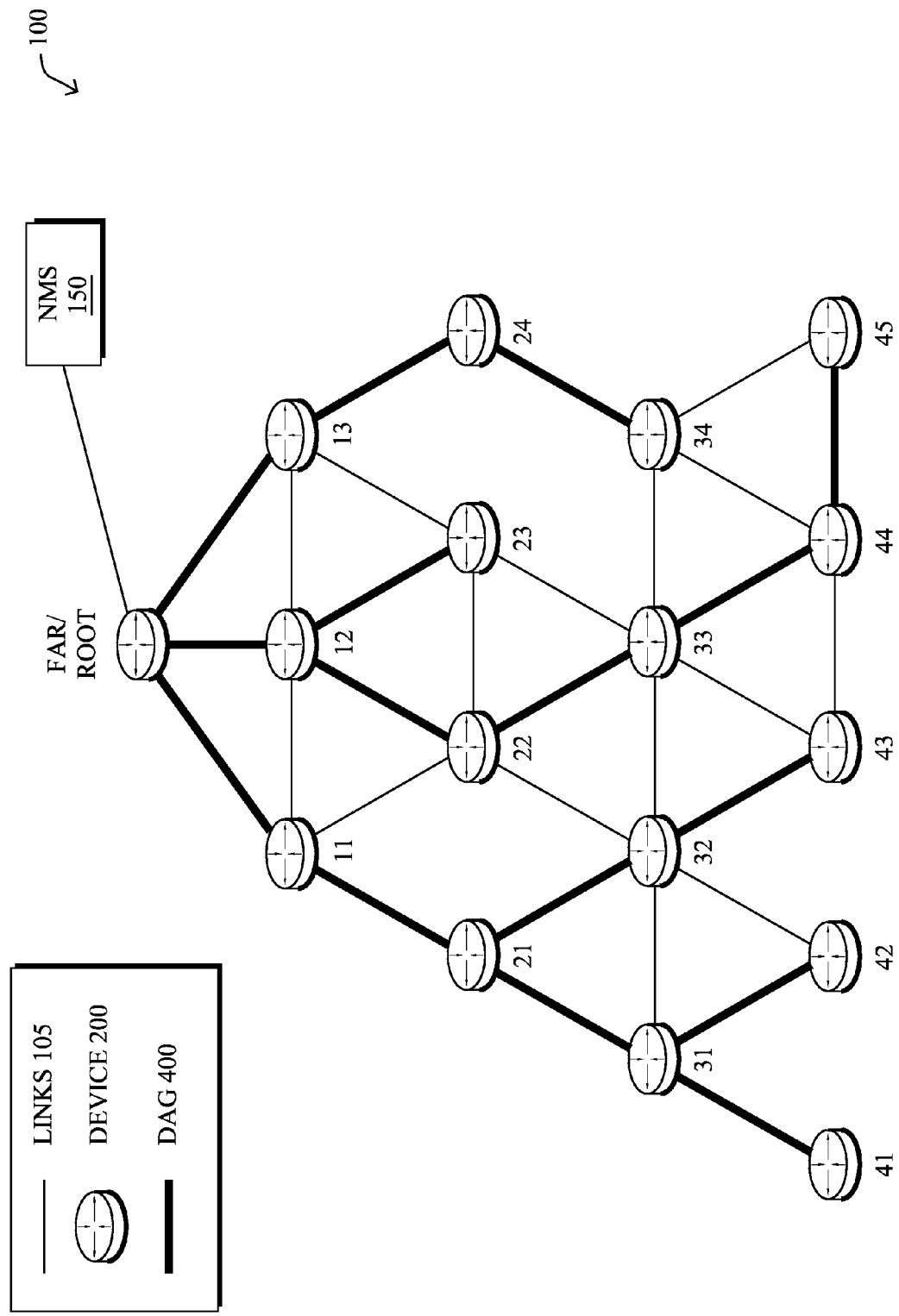
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Figure 5:
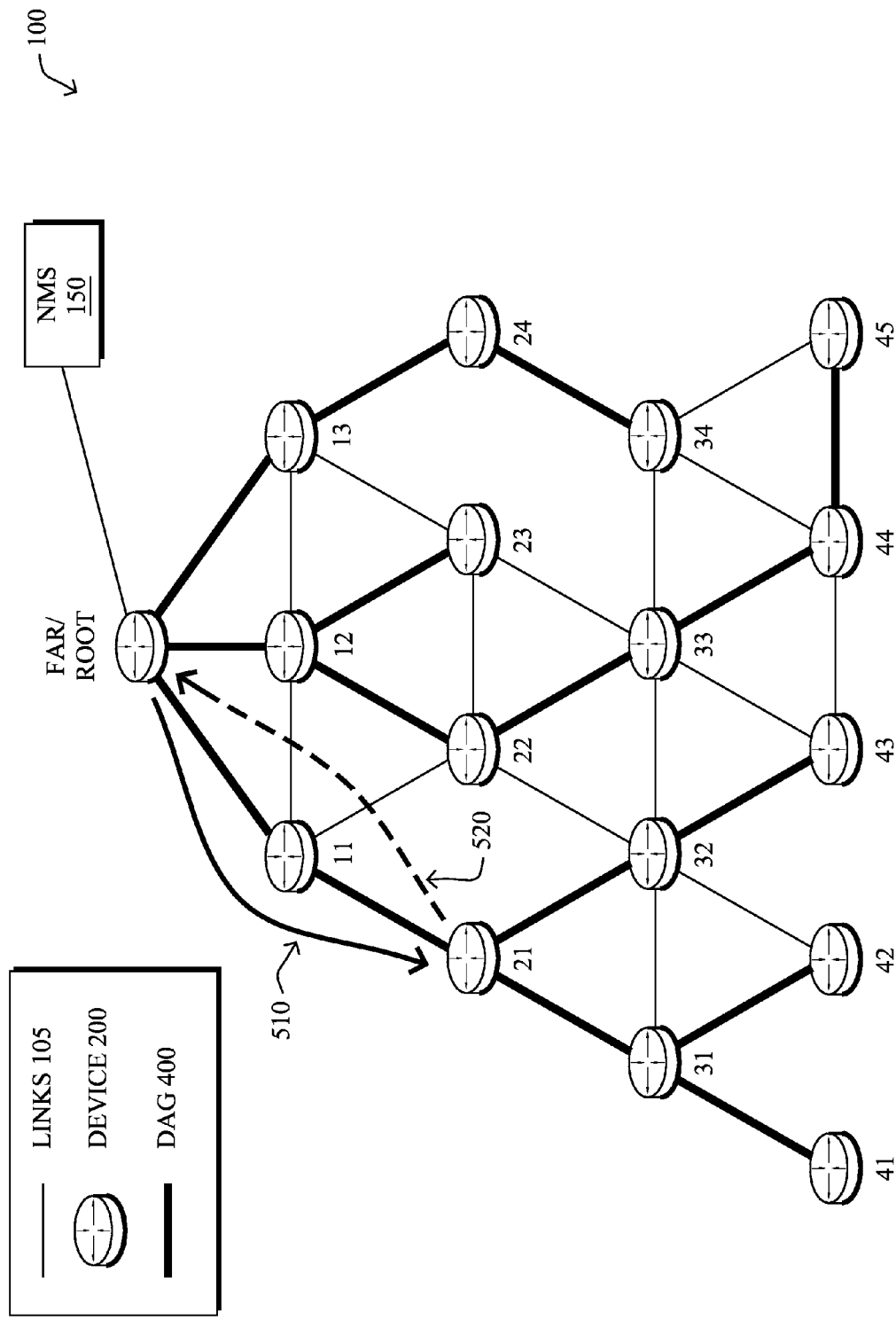
FIG. 5 illustrates an example of probing traffic in a computer network.

As further noted above, during network operation, probing is often utilized for collecting information that is essential for maintaining and optimizing performance of the network. In computer networking generally, a probe is an object used or an action taken for the purpose of learning something about the state of the network. For instance, a message can be sent simply to see whether the destination actually exists. Ping is a common utility for sending such a probe. FIG. 5 illustrates an example of probing traffic in a computer network, whereby a probe 510 is sent from the FAR to a recipient node in the network 100, and the recipient node sends a response 520 to the FAR in response to the probe. The response 520 may include any network information available to the recipient node, typically depending on the contents of the probe 510.

In most computer networks though, and particularly in bandwidth-constrained LLNs, the cost of probing is extremely high and sending large amounts of probes throughout the network typically does not scale well. For example, in a LM-based approach for inferring the end-to-end delay of arbitrary paths in a network, nodes can be probed to retrieve a performance metric (i.e., delay) that enhances the learning process. However, a potentially large number of probes is needed to retrieve the necessary delay measurements and thereby train the regression model. As a result, the increased traffic caused by the probes consumes precious bandwidth. This can be particularly problematic where bandwidth is already constrained in the case of a LLN. Thus, probing nodes in an intelligent and selective manner can help to reduce traffic in the network and optimize network performance. That is, computer networks could benefit from a so-called "smart probing" approach that minimizes the number of probes transmitted without sacrificing the performance of network functionality that relies on information retrieved using the probes.

Probing Technique for Predictive Routing

The techniques herein provide for a LM-based "smart" probing technique that may: (1) dynamically tune the strategy used to select a node to probe next, such that a learning algorithm converges more quickly, (2) tune the rate of probing, which can be a function of the convergence of the algorithm, (3) account for the critical traffic to select nodes that have little impact on the network performance, and (4) provide a mechanism whereby a node, such as the FAR, can delegate the probing to an ancestor of the nodes to be probed.

Specifically, according to one or more embodiments of the disclosure as described in detail below, network information associated with a plurality of nodes in a network is received at a device in a network. From the plurality of nodes, a node is selected based on a determination that the selected node is an outlier among the plurality of nodes according to the received network information. Then, a probe is sent to the selected node, and in response to the probe, a performance metric is received from the selected node at the device.

Illustratively, the techniques described herein may be performed by hardware, software, and/or firmware, such as in accordance with the "learning machine" process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, active learning is a specific area of machine learning in which an algorithm is able to interactively query the information source to obtain a desired output (e.g., delay, link utilization, hop count, path speed, packet loss, path reliability, path bandwidth, throughput, load, MTU, and the like) for a new data point. The LM should be able to determine the measurement to make, according to a score (e.g., a weighted score) indicating an "optimality" of the input data point. This score may be computed only with input data information.

For example, in the LM-based approach for inferring the end-to-end delay of arbitrary paths in a network (referenced above), a regression model (e.g., predictive model) may be used for estimating the delay of any link in the network based on a set of characteristic network properties. In turn, the regression model can be trained by adjusting its own estimates such that it matches the measured delays.

Notably, delay estimations are referenced herein as an illustrative example only and should not be treated as limiting the disclosed embodiments. That is, a predictive model may be used for predicting any performance metric in a computer network, including, but not limited to, delay, link utilization, hop count, path speed, packet loss, path reliability, path bandwidth, throughput, load, and maximum transmission unit (MTU). Moreover, the "smart probing" techniques described herein are not limited to use with predictive models. Rather, the smart probing techniques described herein are applicable to any network configuration with probing traffic, as choosing an optimal probing strategy can benefit network performance in a variety of scenarios.

Referring again to the above example, x may represent a vector of input data, generally indicating the state of the network at a given time t, and y may represent a target value, or in this case, the delay measurement. There are several variants in typical active learning settings, including: i) pool-based active learning, where a large pool of input data $x_1, x_2 \ldots x_n$ is available at any given time and ii) stream-based active learning, where the input data $x_1, x_2 \ldots x_n$ are made available sequentially (e.g., as a stream), one at a time.

In either case, a so-called "relevance score" is typically relied on to measure the amount of information that a particular point (e.g., input data x and measured value y) would bring to the learning process. The relevance score may be a weighted score calculated using a weighted score formula, as described further below. For the purposes of the present disclosure, "relevance score" and "weighted score" may be used interchangeably.

In pool-based active learning, the LM algorithm can compare the scores of the various $x_i$ and select the best one. On the other hand, in stream-based active learning, the LM algorithm can decide whether to send a probe upon receiving the input data point. That is, network information related to a node in a LLN may be received (e.g., from deep packet inspection (DPI), routing table states, etc.), and based on this information, it can be determined whether to probe the node to retrieve its delay, such that the input data vector x (e.g., set of features) and output value y (e.g., delay) can be utilized to train the regression model. Often, this decision is made by comparing the relevance score to a threshold score or by comparing the relevance score to the relevance scores of other nodes in the network.

The relevancy of a node may be computed based on the received network information in multiple ways. For example, the LM may select the node for which it has the least confidence in the prediction made by the predictive model (e.g., "uncertainty sampling"). Further, the LM may select the node that is expected to produce the greatest change in the predictive model (e.g., expected model change).

Even further, a set of devices (e.g., "experts") may host predictive/regression models. Given an input feature vector $x_i$ describing a node i, each expert can predict a different value of the delay associated with this node based on their respective predictive model. For example, each expert j gives a weight $w_{ij}$ to the node i, referring to the relevance of each expert for the task of predicting the delay of node, whereby the sum of $w_{ij}$ for j=1, ... K is one. As a result, the experts effectively compete with each other, and the resulting probability distribution of the delay is the weighted sum of the different predictions. Thus, each expert finds its "relevance region" in the space of the input data.

Accordingly, the "smart probing" technique disclosed herein may rely on one or more of the following principles:

1) Minimization of the prediction uncertainty by probing the node for which the model has the largest variance in its prediction. That is, the performance metric to be received via the probe may be predicted using the predictive model, and a degree of uncertainty of the prediction can be calculated. Then, a node with a large degree of prediction uncertainty may be probed, thereby efficiently training the predictive model.

2) Minimization of the expert repartition uncertainty by probing the node for which the relevance weight of the most probable expert is the closest to 1/K (e.g., equivalent repartition of experts). That is, multiple predictions of the performance metric to be received can be made using multiple predictive models (e.g., at multiple "experts"), and a degree of divergence among the multiple predictions can be calculated. Then, a node can be selected for probing by minimizing a degree of divergence between the expert predictions for that node.

3) Maximization of the expected predictive model change by probing the node that maximizes the change in the estimation of the predictive model parameters. That is, the performance metric to be received via the probe may be predicted using the predictive model, and an expected change in the predictive model can be calculated as if the predictive model was adjusted based on the predicted performance metric. Then, a node that is expected to cause a significant change in the predictive model may be probed. For example, Koller and Tong (Simon Tong, Daphne Koller: Active Learning for Parameter Estimation in Bayesian Networks. NIPS 2000: 647-653) propose a technique that allows for querying the delay measurement of the node that maximizes the expected Kullback-Leibler (KL) divergence between the revised posterior distribution after learning on this point and the current posterior distribution given the data already seen. Posterior distributions of the model parameters are explicitly functions of the input data x, allowing the computation of the optimal x.

Figure 6:
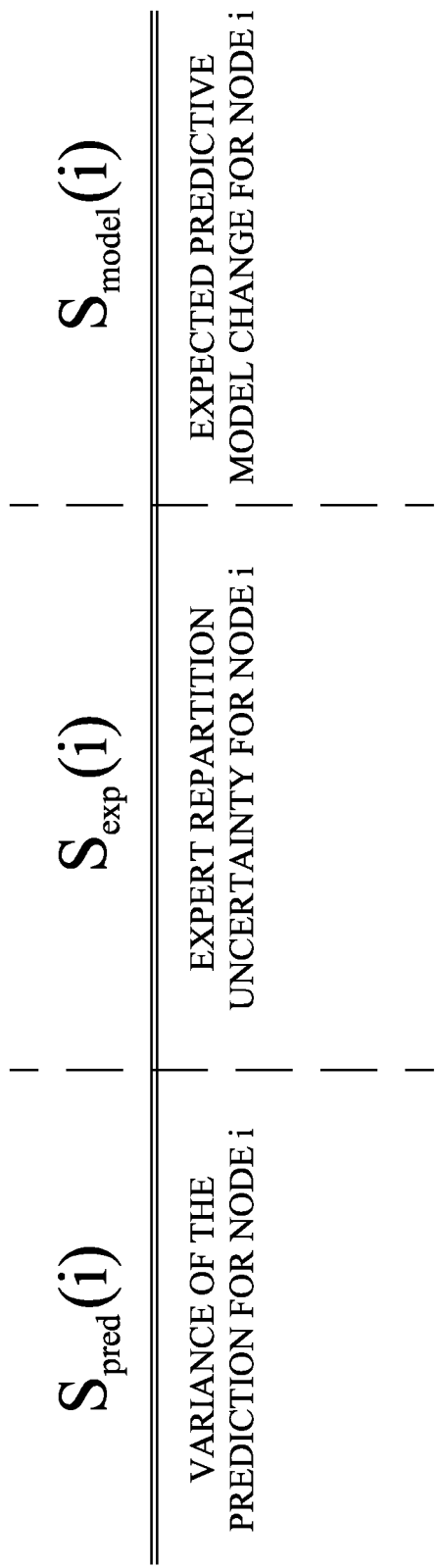
FIG. 6 illustrates example relevance score metrics.

For the purposes of the present disclosure, each of the above principles may be characterized by a different metric, as shown in FIG. 6, and as follows:

1) $S_{pred}(i)$=variance of the prediction for node i;
2) $S_{exp}(i)$=expert repartition uncertainty for node i; and
3) $S_{model}(i)$=expected predictive model change for node i.

Therefore, utilizing the above metrics, an overall relevance score (e.g., "weighted score") S(i) for a node i can be computed. The weighted score is a function of the above metrics, where each metric carries a different amount of importance achieved by multiplying the metrics by dynamically adjustable parameters, as follows:

$$S(i)=a*S_{pred}(i)+b*S_{exp}(i)+c*S_{model}(i),$$

where a, b, and c are dynamic parameters that control the importance of each principle. For instance, in some scenarios, it may be preferable to minimize the prediction uncertainty (e.g., by decreasing the parameter 'a'), whereas in others the best option may be to maximize the expected model change (e.g., by increasing the parameter 'c'). As such, the optimal strategy may be dictated based on the objective function for the particular predictive model. Additionally, the values of the parameter tuple (a, b, c) may be locally determined by each router, or the network policy engine/NMS may allocate different parameter tuple values for each router.

Figure 7:
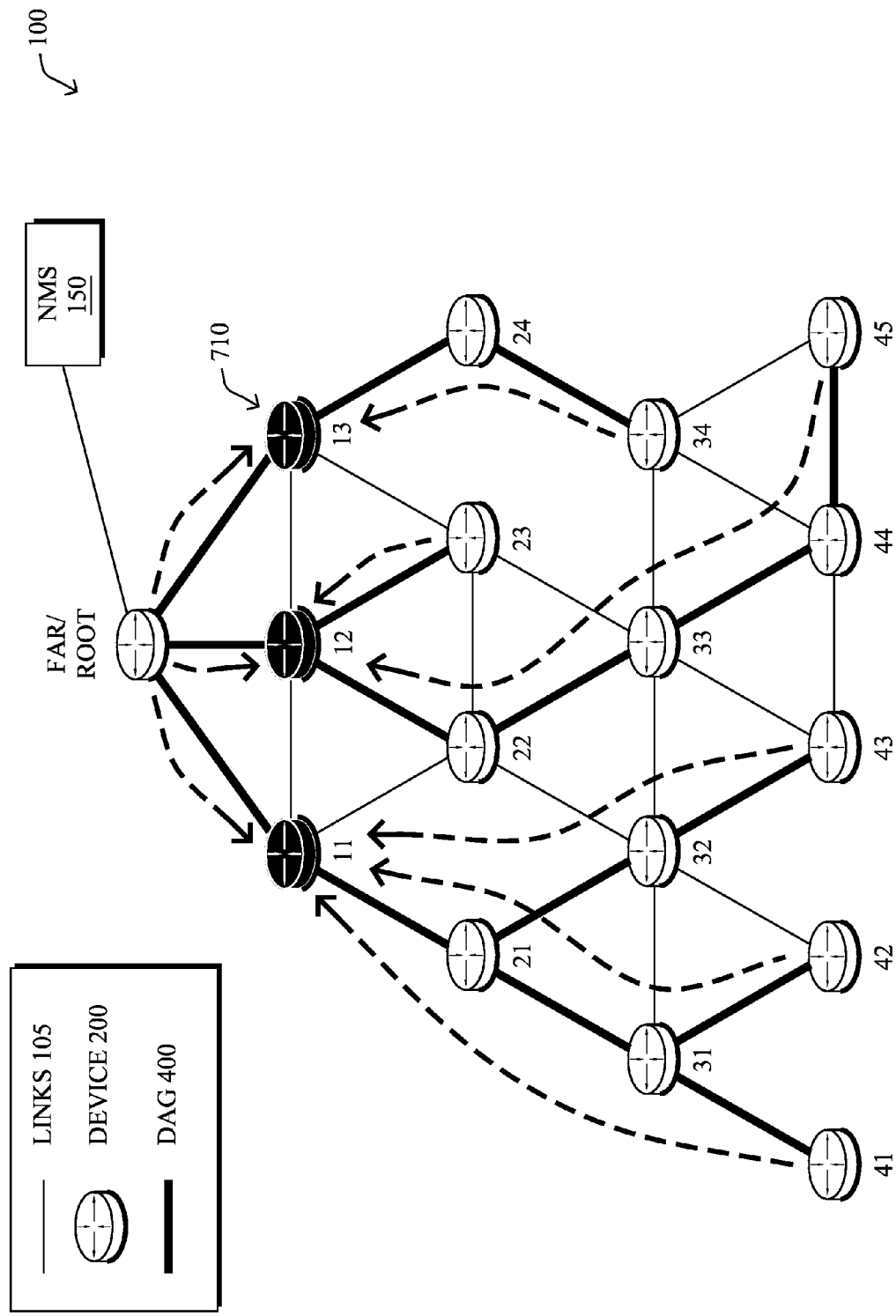
FIG. 7 illustrates an example configuration of probing nodes receiving network information.

FIG. 7 illustrates an example configuration of probing nodes receiving network information. As shown in FIG. 7, the probing devices 710 (e.g., nodes 11, 12 and 13) may receive network information from multiple sources in the network 100. For example, network information may be received via DPI of incoming packets, routing table states from one or more nodes, stored topology information from the FAR, messages sent directly to the probing devices 710 (e.g., in response to a request), and so forth. The network information may include any information that is potentially useful for determining the "relevance" of a node, so as to formulate an optimal probing strategy, as described herein.

Each probing device 710 may host a separate predictive model, each predictive model using a different strategy, e.g., different dynamic parameters (described above). Conceivably, any node 200 in the network 100 may act as a probing device 710; thus, the probing devices 710 shown in FIG. 7 are simply depicted for demonstration purposes only.

Figure 8:
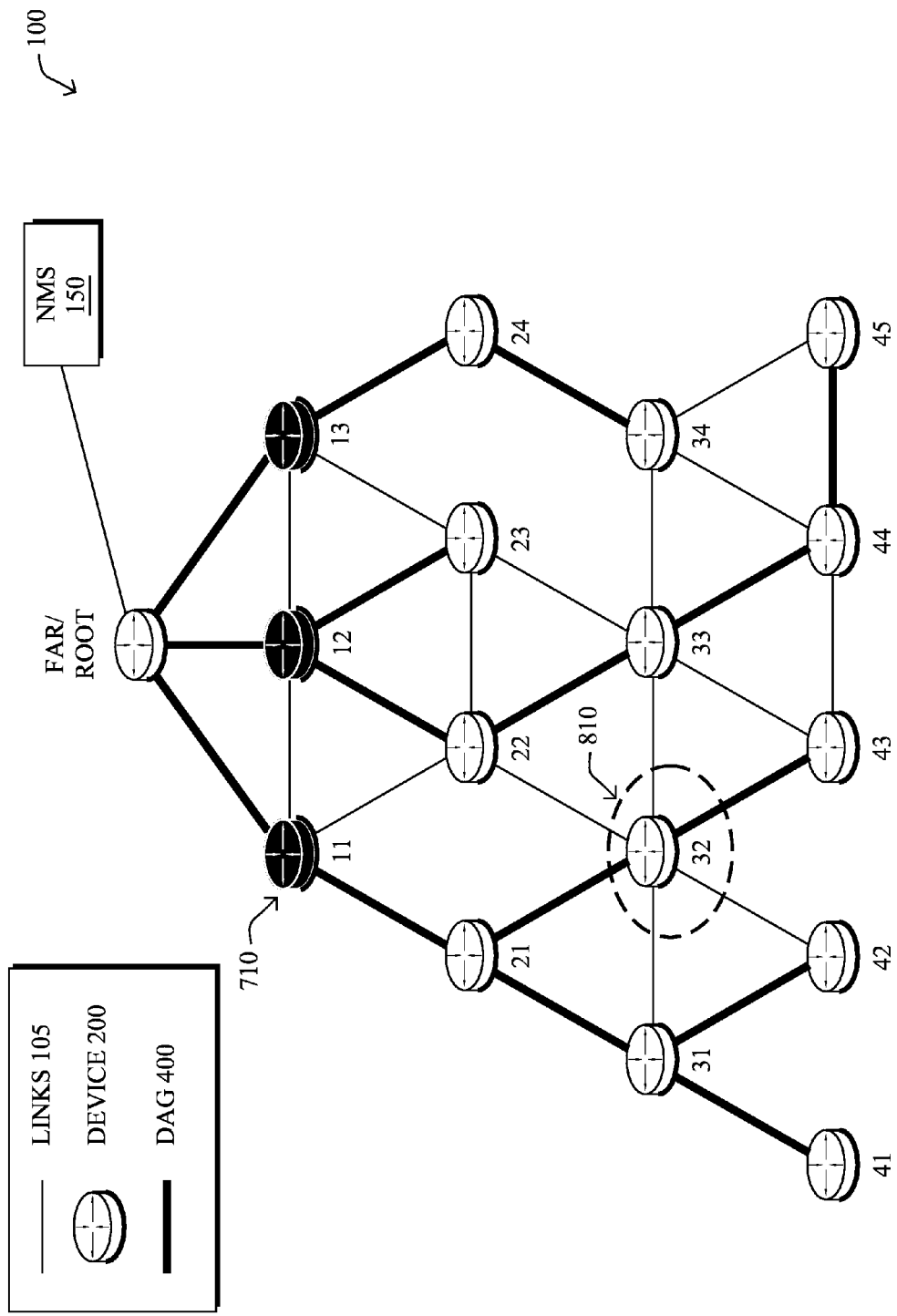
FIG. 8 illustrates an example selection of a node for probing.

FIG. 8 illustrates an example selection of a node for probing. As shown in FIG. 8, the probing device 710 selects the node 810 based on a determination that the selected node 810 is an outlier among the plurality of nodes 200 according to the received network information (as shown in FIG. 7). That is, a weighted score S(i) is calculated for each node based on the received network information, and based on the calculated weighted score, it is determined that the node 810 is an outlier among all nodes 200. Specifically, a node may be considered an outlier among the plurality of nodes 200, and thus worthy of probing, by having a weighted score that exceeds the weighted scores of other nodes in the network, by having a weighted score that exceeds a defined threshold weighted score, or by any other measure indicating that useful information for training the predictive model would be obtained by probing that node.

For example, each probing device 710 may periodically evaluate the weighted score S(i) of each node i in the network 100 and select the node that maximized this score for probing. In other words, it may be determined whether the weighted score associated with the node 810 exceeds the weighted scores associated with the other nodes. Alternatively, it may be determined whether the weighted score associated with the node 810 exceeds a threshold score $S_{probe}$. The threshold score $S_{probe}$ may be adjusted according to the topology of the network 100, as well as the desired network performance. Also, the threshold score $S_{probe}$ may be set to a tunable percentage of the maximal score of all nodes (e.g., 90%).

Similarly, upon reception of a new data point $x_i$, as indicated by received network information (e.g., upon an update of the network characteristics of node i or upon a new node being added to the network), the probing device 710 may probe the corresponding node. Alternatively, the corresponding node may be probed only if its weighted score S(i) exceeds the weighted scores of the other nodes 200, or if it is greater than the threshold score $S_{probe}$.

Figure 9:
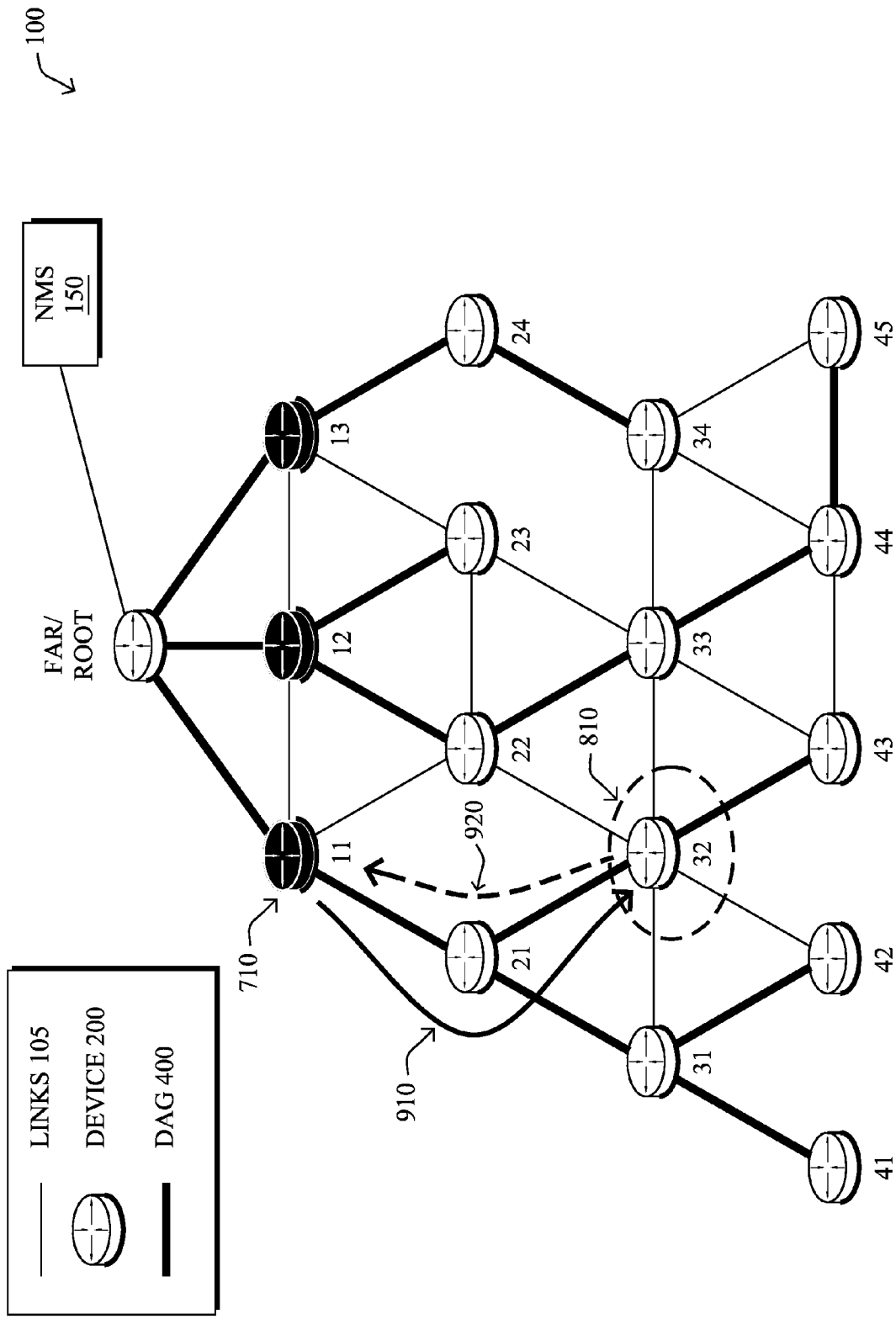
FIG. 9 illustrates an example of probing traffic being sent to the selected node.

FIG. 9 illustrates an example of probing traffic being sent to the selected node. As shown in FIG. 9, probing traffic 910 is sent from the probing device 710 to the selected node 810. In response to the probing traffic 910, the selected node 810 may send a response 920 to the probing device 710. The response 920 may include an indication of a performance metric local to the selected node 810, including, but not limited to, delay, link utilization, hop count, path speed, packet loss, path reliability, path bandwidth, throughput, load, MTU, and the like.

As referenced above, the performance metric may be used to tune a predictive model (hosted on the probing device 710) for predicting one or more performance metrics in the network 100. As such, by selecting the node 810 based on the determination that the node 810 is an outlier among the nodes 200, it is effectively concluded that the node 810 would contribute the most to the training of the predictive model, in terms of model improvement and convergence speed. Therefore, only the nodes providing substantial information to the LM are queried. Furthermore, by intelligently focusing the probing only on nodes/paths that need constant monitoring (or for which increased monitoring may be desirable), the number of probes in the network is reduced, thereby preserving network capacity.

Notably, the probing techniques disclosed herein are not solely applicable to efficiently training predictive models. Rather, the probing techniques may be applicable to other networking configurations, including analytics engines using an optimal probing strategy in order to update its dataset (e.g., network security applications).

Figure 10:
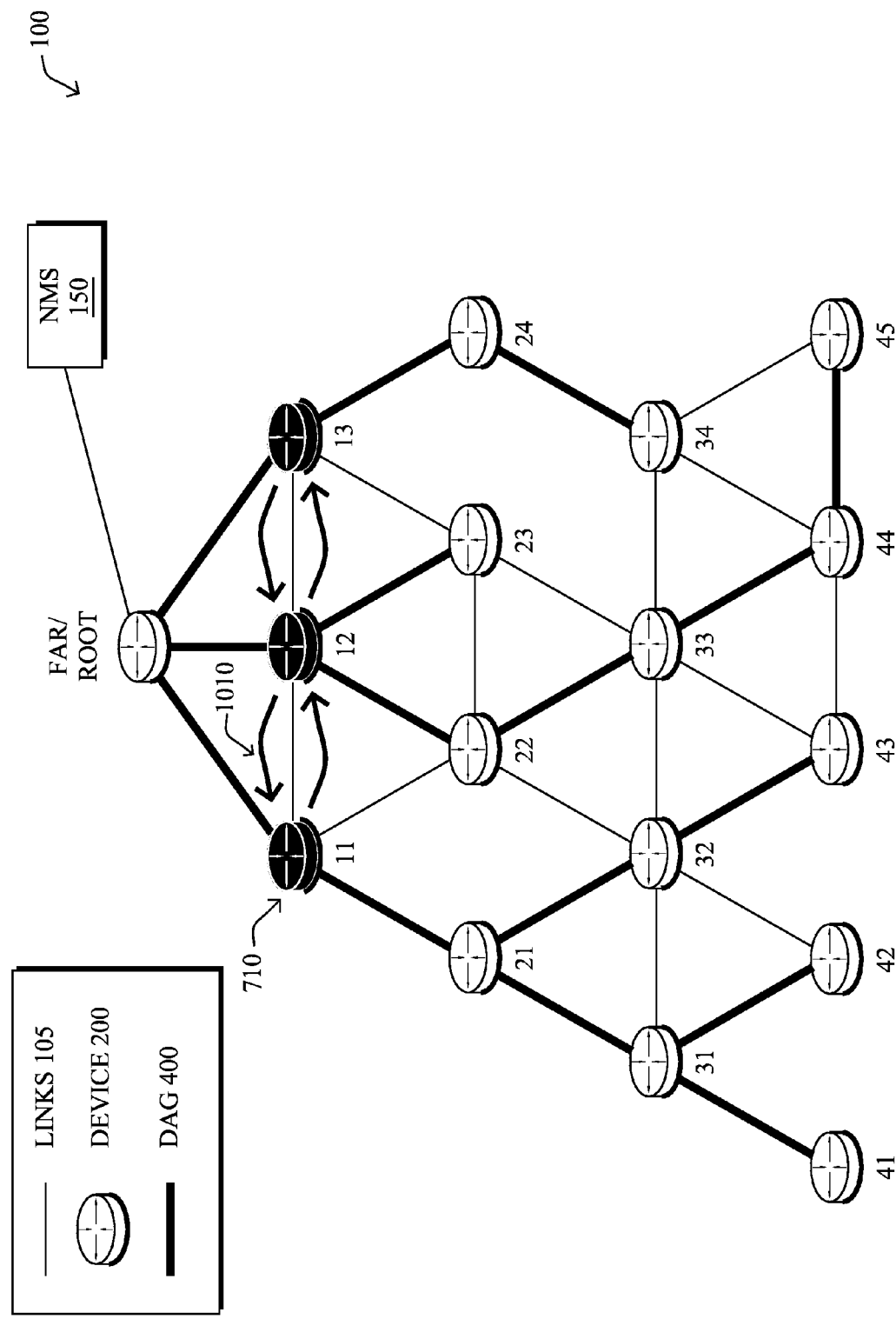
FIG. 10 illustrates an example distributed technique of probing devices sharing their respective probing strategies.

FIG. 10 illustrates an example distributed technique of probing devices sharing their respective probing strategies. As shown in FIG. 10, the probing devices 710 may share their respective probing strategies, as well as the outcomes of the probing strategies, with one another (e.g., labeled as 1010 in FIG. 10). To this point, a set of routers $R_1, R_2, \ldots R_n$ hosting predictive models can share the outcome of their strategies (i.e., differing uses of the dynamic parameters a, b, and c) and compare their respective results by measuring the convergence rate of each algorithm. Upon registering each router hosting a prediction algorithm (e.g., probing device 710) for estimating a network metric in a given network, those routers can retrieve the set of peers with which it should exchange the set of parameters (e.g., from a policy engine or NMS) in order for the whole system to converge. As is known in the art, a fundamental concept of algorithmic learning theory is convergence to the model "limit." That is, as the number of data points (e.g., input data x) increases, a learning algorithm should converge to a correct hypothesis on every possible data sequence consistent with the problem space.

In addition, each probing device 710 may also periodically evaluate a performance metric that measures the convergence of the respective learning algorithm. For example, one can compute the likelihood L of the estimated model with respect to the training data. The likelihood represents the probability of the observed data with respect to the model, and it is thus a measure of how a likely it is that the model has generated these data. As a result, the process of learning (i.e., predictive model training) can consist in maximizing this quantity, such that the model "fits" the observed data, or, more specifically, is very likely to generate this data.

As the training progresses, the quantity L(t), which represents the accuracy likelihood, will vary as a function of the time t (i.e., it will increase) and ultimately converge to a limiting value L*. Each router $R_i$ (e.g., probing devices 710) can then share with the others its likelihood increase $IL_i$ and update its own dynamic parameters (a, b, and c) following, for example, a heuristic similar to that used by Particle Swarm Optimization (PSO). PSO is a computational method often used in optimization, whereby a set of candidate solutions, denoted as particles, move around in a search space in such a way that best-performing particles attract others toward them. Here, a similar approach may be adopted by updating the parameters ($a_i$, $b_i$, $c_i$) for router $R_i$, such that they get closer to the parameters (a*, b*, c*) of the best-performing router R* (e.g., the router that has the largest likelihood increase IL*). For example, an IPv6 multicast communication can be used by all collaborating probing devices 710 to periodically exchange their respective parameter tuple (a, b, c) and likelihood increase $IL_i$. Importantly, by sharing probing strategies between different routers, the model convergence rates can be improved, thus improving the performance of large-scale systems.

Figure 11A:
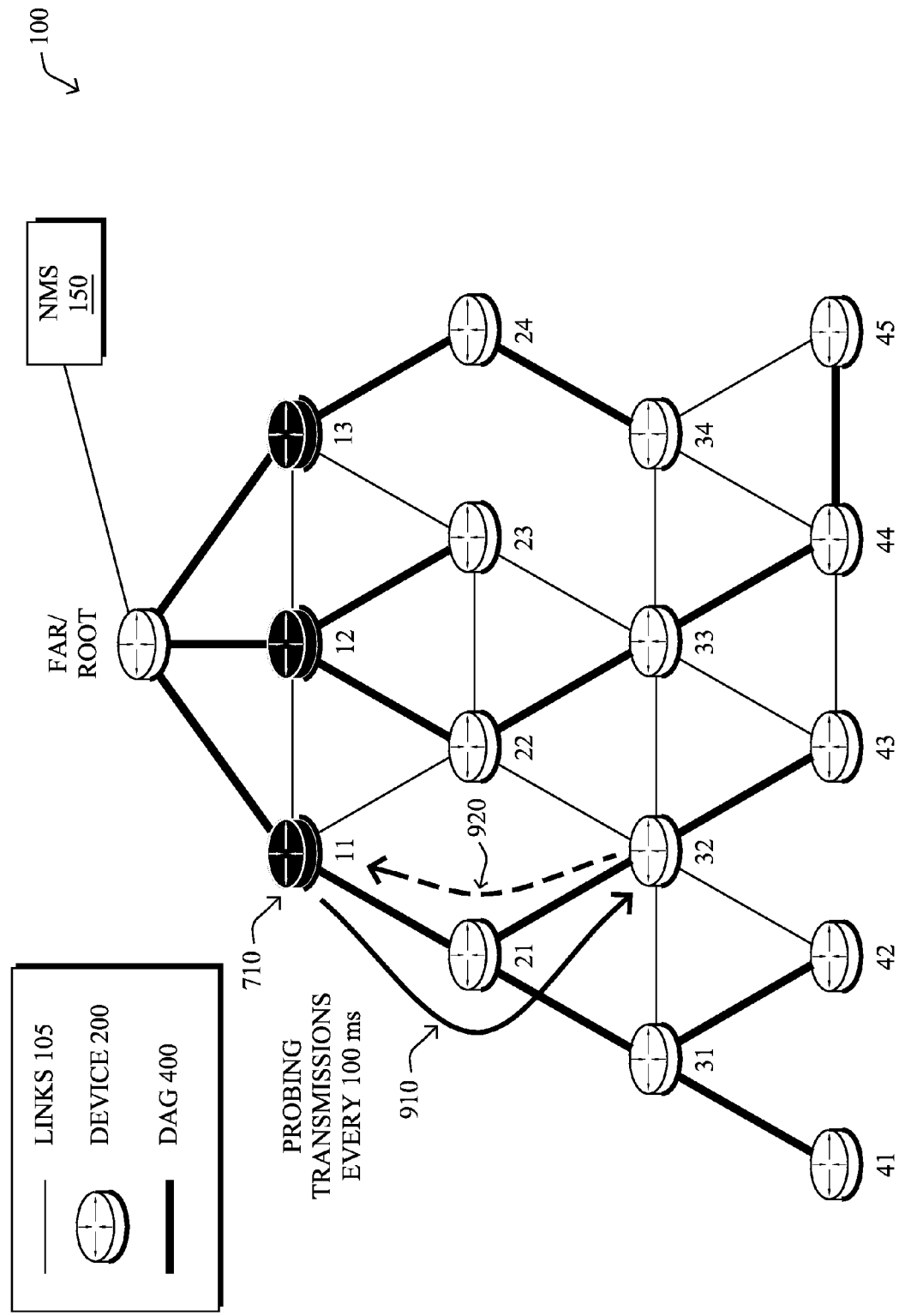
FIGS. 11A and 11B illustrate example configurations of tuning the probing rate.
Figure 11B:
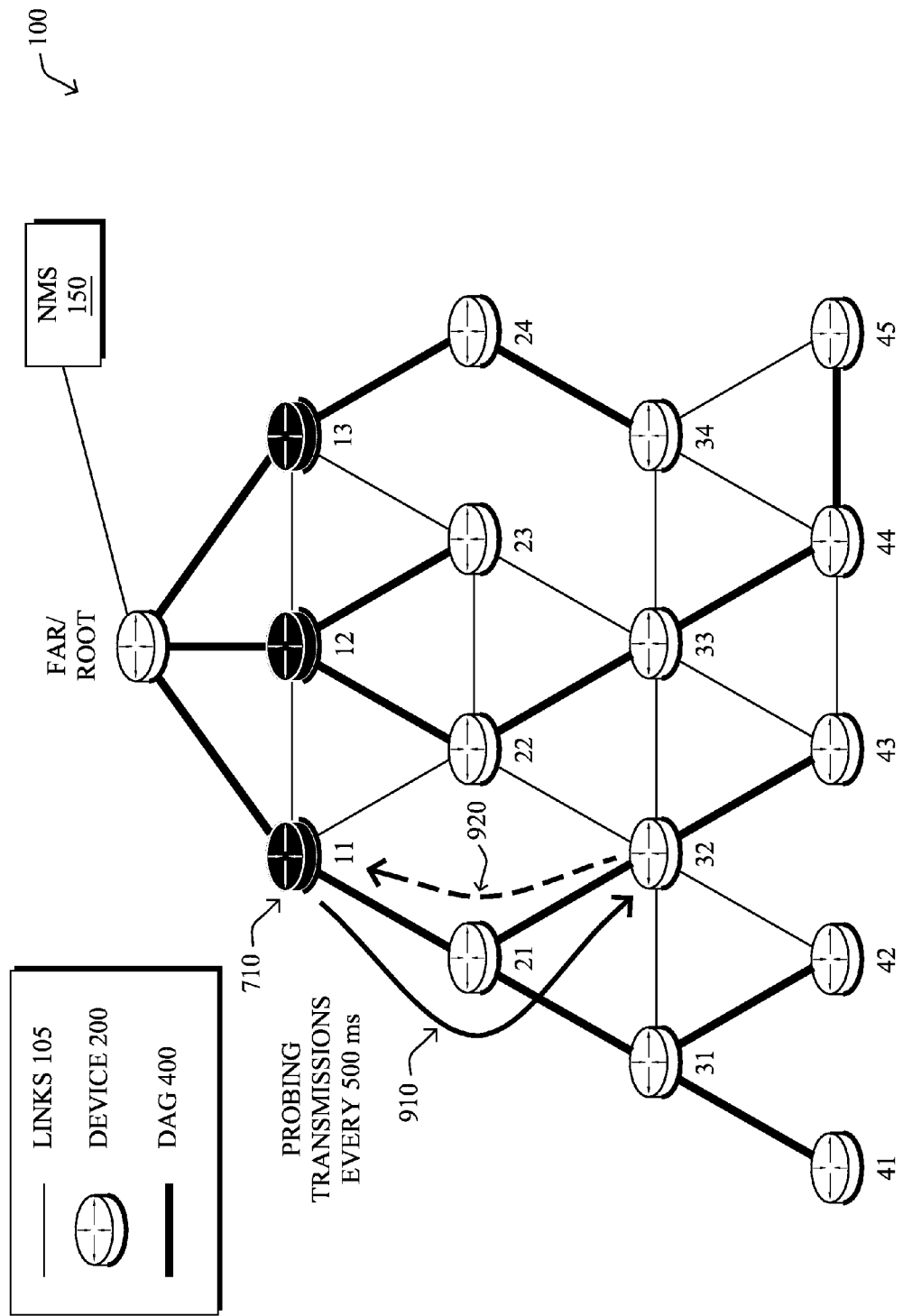

FIGS. 11A and 11B illustrate example configurations of tuning the probing rate. As shown in FIG. 11A, the probing node 710 sends probing traffic 910 to target nodes every 100 ms. However, as shown in FIG. 11B, the probing transmission rate may be adjusted, such that the probing node 710 sends probing traffic 910 to target nodes every 500 ms.

To this point, the rate at which the LM sends out probes $R_{probe}$ may be tuned based on a desired performance of the network. More specifically, the rate $R_{probe}$ may be tuned according to the convergence of the predictive model, so as to improve the convergence rate of the model. The tuning rate may be computed, as follows:

$$R_{probe} = R_{min} + \text{alpha} * |dL(t)/dt|,$$

where $R_{min}$ and alpha are dynamic tuning parameters that denote the minimal rate of probing and a scaling factor, respectively, and dL(t)/dt is the first order derivative of L(t) as a function of time. When the algorithm converges, dL(t)/dt will decrease to zero, and $R_{probe}$ will decrease to $R_{min}$.

Once $R_{min}$ has been computed, several actions may take place. First, $R_{min}$ may be reported to the NMS or other LM-controlling device in order to determine whether or not the probing activity 910 is acceptable in light of the bandwidth capacity (which is a function of time). Knowing the minimum probing rate is important for the NMS/LM-controlling device, which may as a result, decide to further reduce the probing rate at the risk of impacting the performance prediction. Alternatively, other approaches may be adopted, such as scheduling probes in the network simply for the sake of training the model. This approach involves sharing the value of $R_{min}$ with other routers in the group of probing devices 710.

Figure 12:
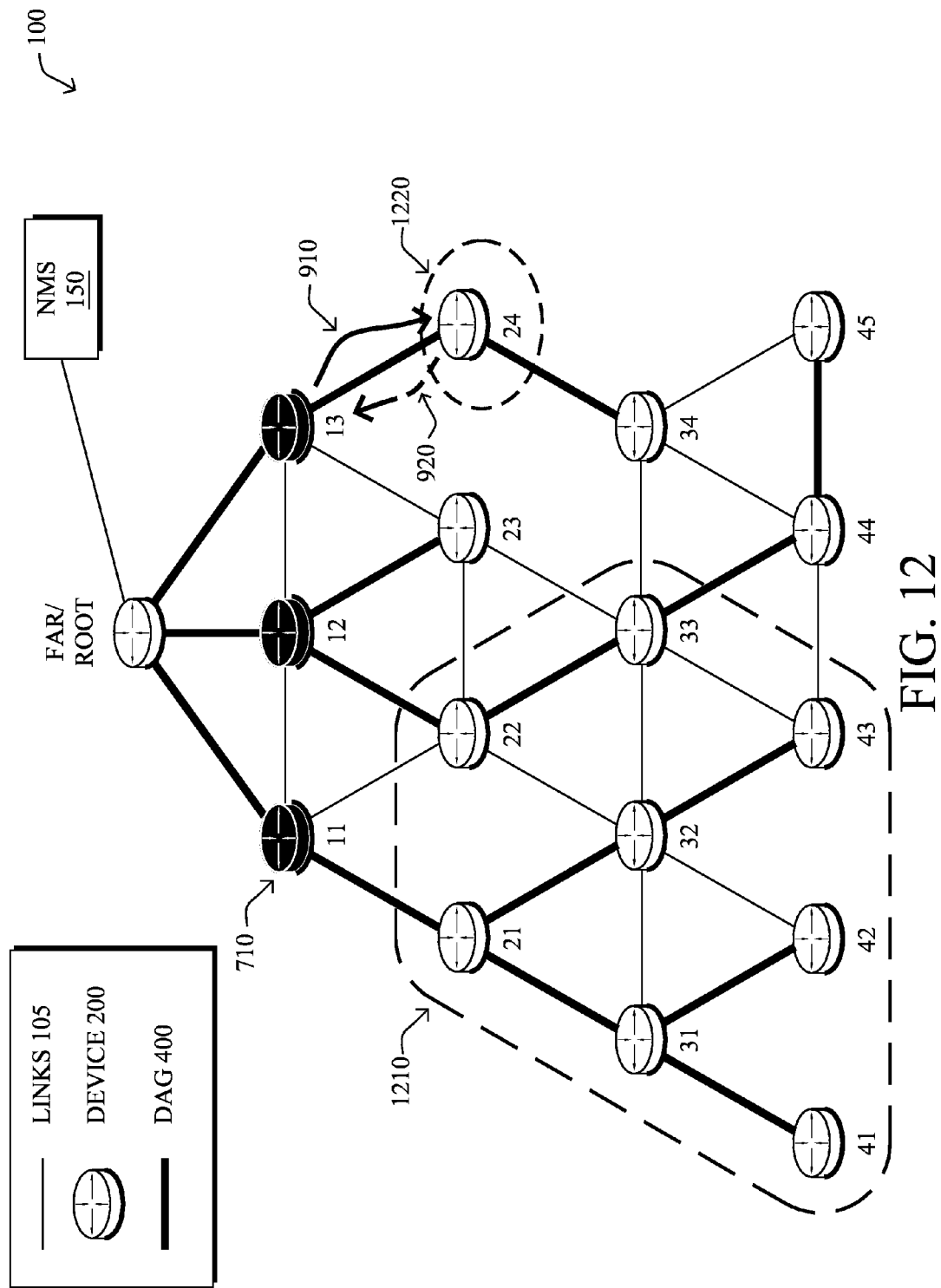
FIG. 12 illustrates an example configuration involving sending probing traffic based in part on traffic in the network.

FIG. 12 illustrates an example configuration involving sending probing traffic based in part on traffic in the network. As shown in FIG. 12, excessive network traffic 1210 exists in the network 100. As a result, sending probing traffic to this area of the network may exacerbate the issue of excessive traffic. Thus, it would be advantageous to consider the traffic in the network and select an alternate node 1220 outside of the excessive traffic area 1210. Then, probing traffic 910 may be sent from the probing device 710 to the alternate node 1220, as usual.

To this point, the traffic activity in the network may be taken into account in light of the dynamically changing network capacity. With respect to LLNs, the traffic matrix can be easily computed in the case of RPL non-storing since all traffic goes through the FAR. As a result, the application policy infrastructure controller (APIC) and/or the NMS may decide which node(s) can be probed without impacting too much of the network performance, considering the probing rate $R_{min}$. In this regard, a cost function may be used that combines the score S(i) and the amount of critical traffic routed along the path to node $N_i$. Using this cost function, even if a node is optimal from the learning standpoint (e.g., it is the originally selected node 810), it may not be probed if excessive amounts of critical traffic would be affected by probing it.

Figure 13:
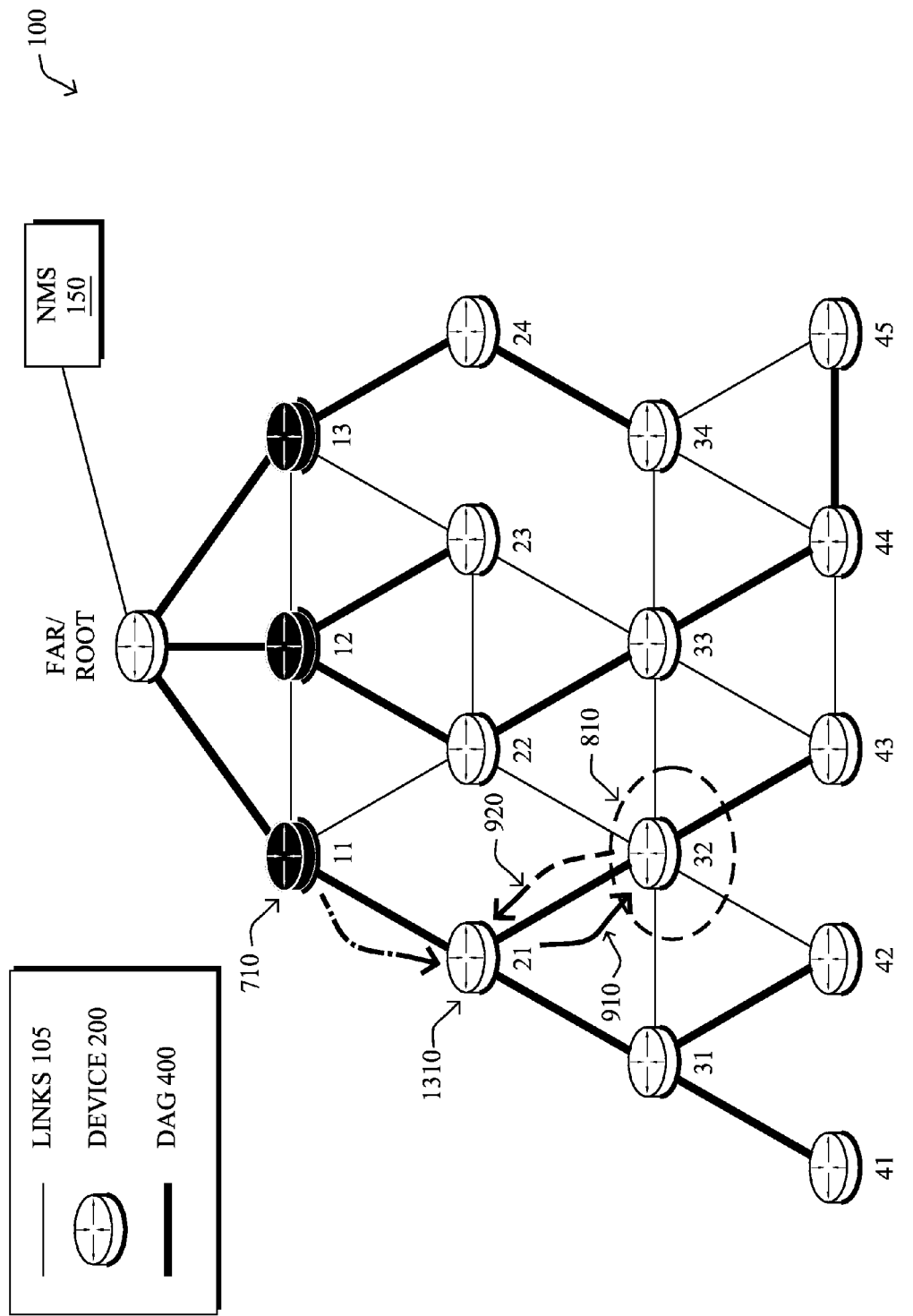
FIG. 13 illustrates an example configuration where another node in the network is instructed to send probing traffic.

FIG. 13 illustrates an example configuration where another node in the network is instructed to send probing traffic. As shown in FIG. 13, the probing device 710 may delegate the probing responsibilities, either temporarily or permanently, to another node 1310. Then, the node 1310 may send the probing traffic 910 to the selected node 810, as desired. This can provide for greater efficiency in the network by freeing bandwidth for the probing device 710, while reducing traffic in the network 100 by having another node 1310 that is closer in the topology to the selected node 810 send the probe 910 to the selected node, thereby reducing the distance the probing traffic 910 must travel to its destination.

Typically, if the LM identifies a group of relevant nodes that have a common ancestor $N_a$ (e.g., node 1310), the probing may be delegated to this ancestor in order to reduce the impact on the network upstream. For example, the LM may send a message to the ancestor node $N_a$ indicating that it can gather the desired performance metric from a set of proximate nodes. In particular, the LM may send a time-stamped message $R_{probe}$ to $N_a$ that includes a set of nodes to be probed, along with the size S of the probes, and the time interval T between each probe. After the probing, the node $N_a$ can reply to the FAR or other root device with a response message that indicates the delay for each node in the set. In particular, the response may include a time-stamped message $R_{reply}$ that includes the delay for each node in the set, as well as the delay for $R_{probe}$ to reach $N_a$. The FAR may then re-construct the round-trip delay time (RTT) to $N_a$ as well as to each node in the set by using the timestamp of $R_{probe}$ and its content.

Figure 14:
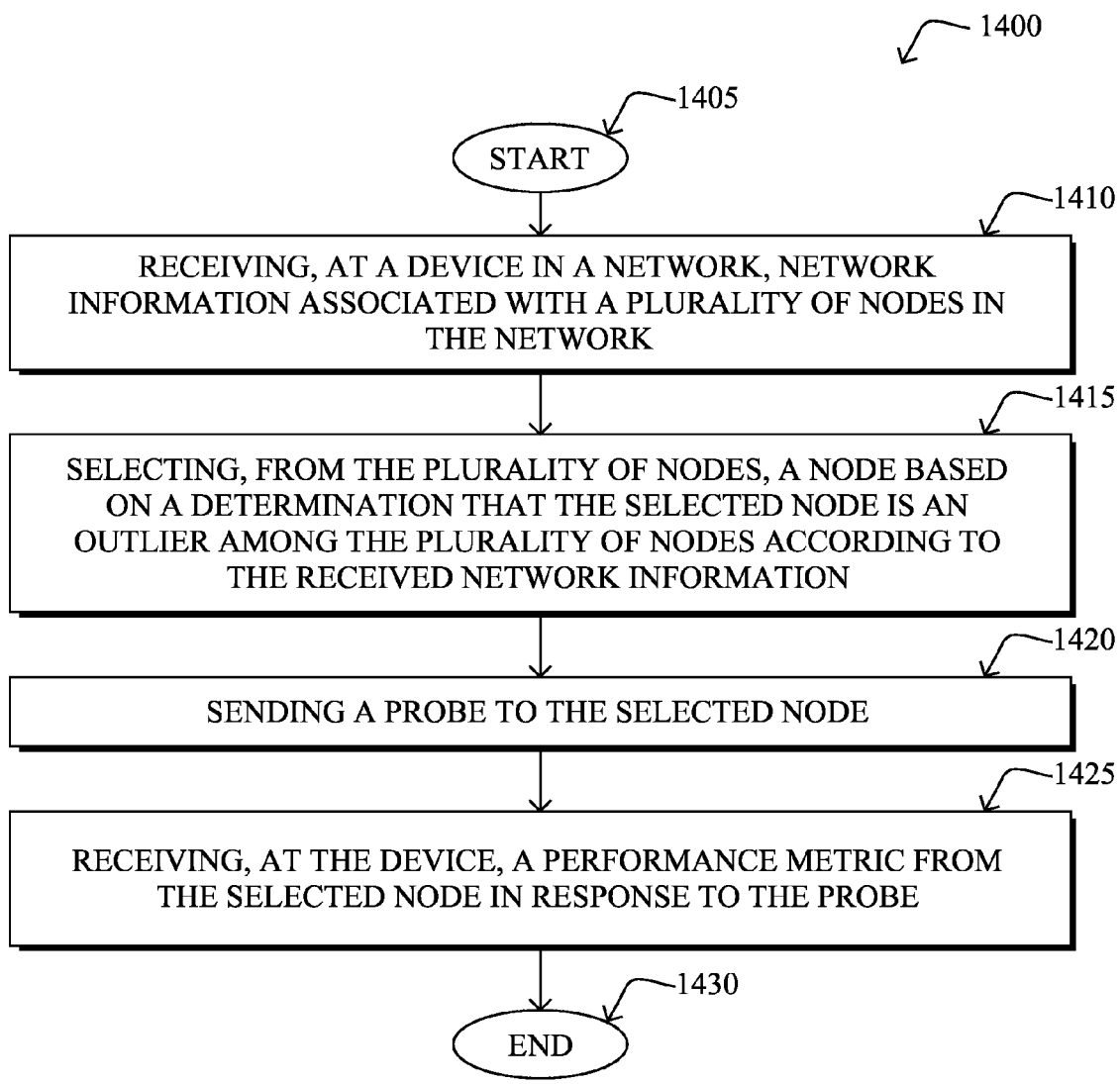
FIG. 14 illustrates an example simplified procedure for probing techniques in computer networks.

FIG. 14 illustrates an example simplified procedure for probing techniques in computer networks. The procedure 1400 may start at step 1405, and continues to step 1410, where, as described in greater detail above, a node is selected for probing based on a determination that it is an outlier among the other nodes in the network (e.g., it is "relevant").

At step 1410, network information associated with a plurality of nodes in a network is received at a device in a network. As described above, the probing devices in the network (any devices in the network may operate as a probing device) may receive network information from multiple sources in the network. For example, network information may be received via DPI of incoming packets, routing table states from one or more nodes, stored topology information from the FAR, messages sent directly to the probing devices (e.g., in response to a request), and so forth.

At step 1415, a node is selected, from the plurality of nodes, based on a determination that the selected node is an outlier among the plurality of nodes according to the received network information. For example, each probing device may periodically evaluate the weighted score S(i) of each node i in the network and select the node that maximized this score for probing. In other words, it may be determined whether the weighted score associated with the node exceeds the weighted scores associated with the other nodes. Alternatively, it may be determined whether the weighted score associated with the node exceeds a threshold score $S_{probe}$.

At step 1420, a probe is then sent to the selected node, and at step 1425, in response to the probe, a performance metric is received from the selected node at the device. The response may include an indication of a performance metric local to the selected node, including, but not limited to, delay, link utilization, hop count, path speed, packet loss, path reliability, path bandwidth, throughput, load, MTU, and the like.

The procedure 1400 illustratively ends at step 1430. The techniques by which the steps of procedure 1400 may be performed, as well as ancillary procedures and parameters, are described in detail above.

It should be noted that the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for intelligent probing techniques in computer networks. In particular, the techniques herein minimize the impact of probing on the network performance without compromising on the accuracy and the reliability of the learning process by using active learning techniques to choose which nodes/routes to probe for predictive performance analytics.

While there have been shown and described illustrative embodiments that provide for intelligent probing techniques in computer networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. In addition, while certain protocols are shown, such as RPL, other suitable protocols may be used, accordingly. Further, the smart probing techniques described herein are not limited to use with predictive models. Rather, the smart probing techniques are applicable to any network configuration with probing traffic, as choosing an optimal probing strategy can benefit network performance in a variety of scenarios. Even further, although probing nodes for a delay measurement is described herein, the delay metric is merely an illustrative example and should not be treated as limiting the disclosed embodiments. That is, nodes in the network may be probed for any performance metric, including, but not limited to, delay, link utilization, hop count, path speed, packet loss, path reliability, path bandwidth, throughput, load, and maximum transmission unit (MTU).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, network information associated with a plurality of nodes in the network;
   selecting a node for probing from the plurality of nodes based on a determination that the selected node is an outlier among the plurality of nodes according to the received network information, wherein the determination that the selected node is an outlier among the plurality of nodes includes:
  calculating a weighted score associated with the selected node using a weighted score formula having dynamically adjustable parameters, wherein the dynamically adjustable parameters are set based on one of: instructions received from a centralized management node and a local determination at the device;
sending a probe to the selected node; and
receiving, at the device, a performance metric from the selected node in response to the probe.

2. The method as in claim 1, further comprising:
hosting, at the device, a predictive model for predicting one or more performance metrics in the network; and
tuning the predictive model based on the received performance metric.

3. The method as in claim 1, further comprising:
calculating weighted scores associated with other nodes in the network; and
determining that the selected node is an outlier when the weighted score associated with the selected node exceeds the weighted scores associated with the other nodes.

4. The method as in claim 1, further comprising:
determining that the selected node is an outlier when the weighted score exceeds a threshold score.

5. The method as in claim 1, wherein the calculating of the weighted score comprises:
predicting the performance metric to be received using a predictive model; and
calculating a degree of uncertainty of the prediction.

6. The method as in claim 1, wherein the calculating of the weighted score comprises:
predicting the performance metric to be received using a predictive model; and
calculating an expected change in the predictive model as if the predictive model was adjusted based on the predicted performance metric.

7. The method as in claim 1, wherein the calculating of the weighted score comprises:
making multiple predictions of the performance metric to be received using multiple predictive models; and
calculating a degree of divergence among the multiple predictions.

8. The method as in claim 1, further comprising:
comparing a convergence rate of a predictive model hosted on the device to a convergence rate of a predictive model hosted on another device in the network; and
adjusting the dynamically adjustable parameters based on the comparison.

9. The method as in claim 1, wherein the sending of the probe comprises:
determining whether to send the probe to the selected node based in part on traffic in the network.

10. The method as in claim 1, further comprising:
sending a plurality of probes to nodes selected from the plurality of nodes; and
adjusting a rate at which the a plurality of probes are sent.

11. The method as in claim 1, wherein the sending of the probe comprises:
instructing another node in the network to send the probe to the selected node.

12. An apparatus, comprising:
one or more network interfaces to communicate with a network;
a processor coupled to the one or more network interfaces and adapted to execute a process; and
a memory configured to store program instructions which include the process executable by the processor, the process comprising:
  receiving, as a device in the network, network information associated with a plurality of nodes in the network;
  selecting a node for probing from the plurality of nodes based on a determination that the selected node is an outlier among the plurality of nodes according to the received network information, wherein the determination that the selected node is an outlier among the plurality of nodes includes:
    calculating a weighted score associated with the selected node using a weighted score formula having dynamically adjustable parameters, wherein the dynamically adjustable parameters are set based on one of: instructions received from a centralized management node and a local determination at the device;
  sending a probe to the selected node; and
  receiving, at the device, a performance metric from the selected node in response to the probe.

13. The apparatus as in claim 12, wherein the process further comprises:
hosting, at the device, a predictive model for predicting one or more performance metrics in the network; and
tuning the predictive model based on the received performance metric.

14. The apparatus as in claim 12, wherein the process further comprises:
calculating weighted scores associated with other nodes in the network; and
determining that the selected node is an outlier when the weighted score associated with the selected node exceeds the weighted scores associated with the other nodes.

15. The apparatus as in claim 12, wherein the process further comprises:
determining that the selected node is an outlier when the weighted score exceeds a threshold score.

16. The apparatus as in claim 12, wherein the calculating of the weighted score comprises:
predicting the performance metric to be received using a predictive model; and
calculating a degree of uncertainty of the prediction.

17. The apparatus as in claim 12, wherein the calculating of the weighted score comprises:
predicting the performance metric to be received using a predictive model; and
calculating an expected change in the predictive model as if the predictive model was adjusted based on the predicted performance metric.

18. The apparatus as in claim 12, wherein the calculating of the weighted score comprises:
making multiple predictions of the performance metric to be received using multiple predictive models; and
calculating a degree of divergence among the multiple predictions.

19. The apparatus as in claim 12, wherein the process further comprises:
   comparing a convergence rate of a predictive model hosted on the device to a convergence rate of a predictive model hosted on another device in the network; and
   adjusting the dynamically adjustable parameters based on the comparison.

20. The apparatus as in claim 12, wherein the sending of the probe comprises:
   determining whether to send the probe to the selected node based in part on traffic in the network.

21. A tangible non-transitory computer readable medium storing program instructions that cause a computer to execute a process, the process comprising:
   receiving, at a device in a network, network information associated with a plurality of nodes in the network;
   selecting a node for probing from the plurality of nodes based on a determination that the selected node is an outlier among the plurality of nodes according to the received network information, wherein the determination that the selected node is an outlier among the plurality of nodes includes:
      calculating a weighted score associated with the selected node using a weighted score formula having dynamically adjustable parameters, wherein the dynamically adjustable parameters are set based on one of: instructions received from a centralized management node and a local determination at the device;
   sending a probe to the selected node; and
   receiving, at the device, a performance metric from the selected node in response to the probe.

* * * * *